July 16, 1968     G. GRIMM     3,392,817
TUBULAR CONVEYOR BELT EDGE CONTROL
Original Filed May 13, 1966     2 Sheets-Sheet 1
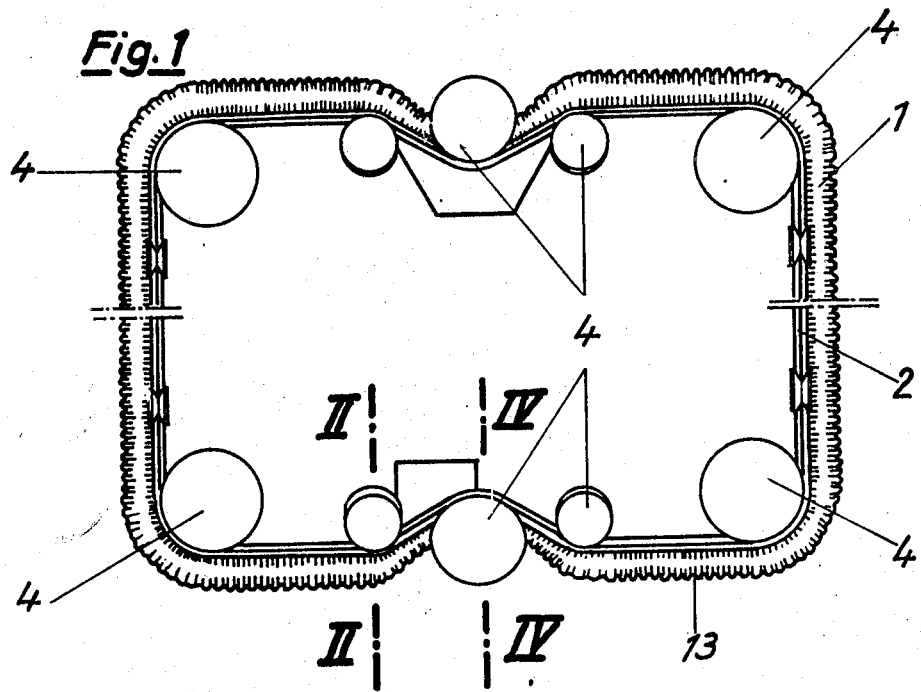
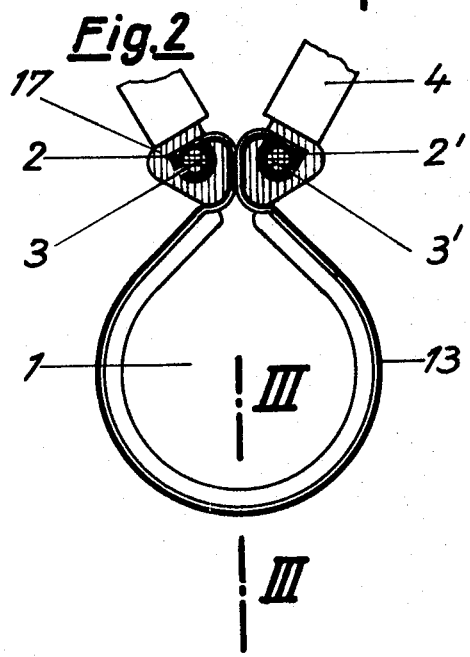
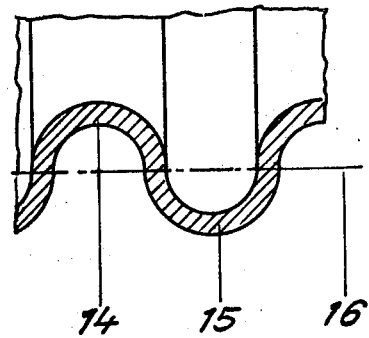
INVENTOR
GERHARD GRIMM
By Shoemaker and Mattare
ATTYS.

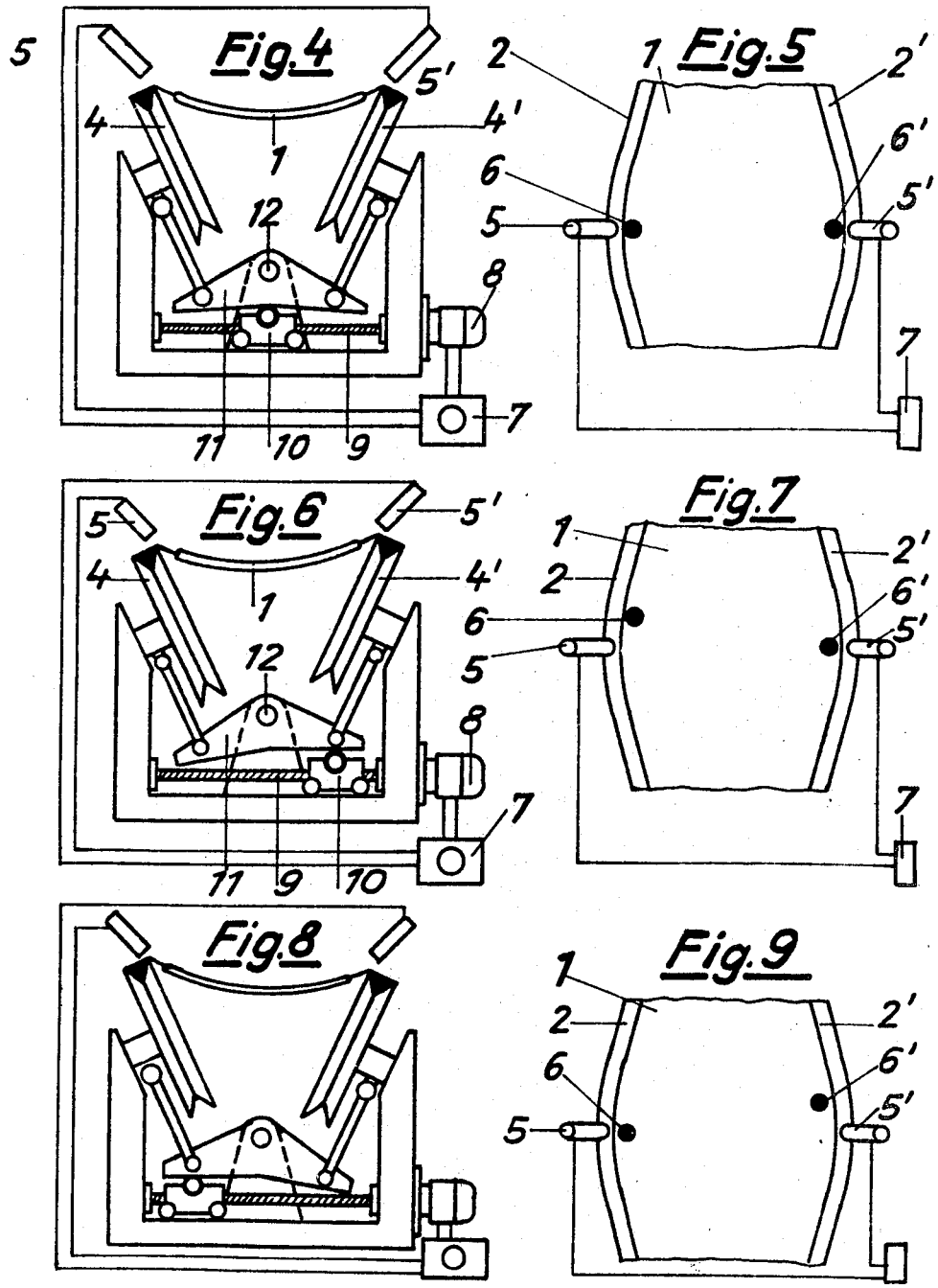

United States Patent Office 3,392,817
Patented July 16, 1968

3,392,817
TUBULAR CONVEYOR BELT
EDGE CONTROL
Gerhard Grimm, 19 Lohensteinstrasse,
Munich-Pasing, Germany
Continuation of application Ser. No. 549,909, May 13, 1966. This application Sept. 18, 1967, Ser. No. 671,919
3 Claims. (Cl. 198—184)

ABSTRACT OF THE DISCLOSURE

The invention relates to means controlled by detectors for synchronizing the forward movement of the two longitudinal edges of a tubular conveyor belt. The means includes two adjacent movable pulleys for deflecting the two edges of the belt, and a beam balance interconnecting the pulleys so that movement of the beam increases the deflection of one edge and decreases that of the other. The tubular conveyor belt has transverse arcuate corrugations outside the region of its edges.

---

This application is a continuation of my application Ser. No. 549,909, filed May 13, 1966, now abandoned.

The invention relates to tubular conveyor belts.

According to one aspect of the invention, there is provided control apparatus for synchronizing the forward movement of the two longitudinal edges of a tubular conveyor belt which is drawn forward by its longitudinal edges, which apparatus comprises at least two stationary detectors positioned for actuation by markers on the two edges of said belt, and means controlled by said detectors for varying the length of at least one edge of the belt.

According to a second aspect of the invention, there is provided a tubular conveyor belt adapted to be pulled forward by its edges and having corrugations outside the region of its edges, the wall region of the belt where the crests and roots of the corrugations merge being substantially perpendicular to the neutral bending zone of the belt.

The longitudinal forces of the belt may be transmitted through drawing members provided in its beaded edges, which are preferably in the form of steel cables embedded in the edges of the belt, while the actual conveying tube remains practically free from such forces. A belt of this type is usually driven by means of deflecting pulleys which entrain it by means of friction between the periphery of the pulley and the edge of the belt.

This frictional transmission of force between the pulleys and the edges of the belt very often leads to the disadvantage that the edges of the belt do not move synchronously on both sides, that is to say that one edge of the belt is in advance of the other. This occurs particularly if one edge of the belt is stretched, e.g. by heat acting on it from the outside, and thus lengthened in relation to the other edge so that it has to describe a longer path per circuit. Since both edges move at the same speed a given point on the longer edge will require a longer time for a full circuit than will the corresponding point on the other edge. In this way the stretched edge will lag behind the other one. This lag will increase from circuit to circuit as the differences in distance travelled per circuit are summated. The process continues until the conveyor belt can no longer tolerate the difference, i.e. until it suffers internal tension between the two edges, finally leading to the tearing of the belt.

The two edges of a conveyor belt can indeed be forced to move synchronously by locking structures such as zip fasteners or serrations designed to close the tube. But the drawing cables may then move about in the edges of the belt and cause considerable wear. Moreover serrations and the like are highly trouble prone as a result of dirt and are expensive to manufacture.

The problem underlying the invention is to keep the two edges of the belt and the drawing members such as endless steel cables provided therein in tubular conveyor belts of the above type constantly synchronized without having recourse to such locking or otherwise positively engaging structures, in order to prevent one edge of the belt from moving ahead of or lagging behind the other.

In the preferred tubular conveyor belt conveyor system herein proposed at least two stationary detectors are provided at the two edges of the belt, measuring points or markers provided at the edges pass simultaneously through the said detectors when the edges are moving synchronously, and when one edge moves ahead the associated detector is energized by the marker in question and acts on means which cause at least one edge of the belt to vary in length until synchronous movement is re-established.

With the aid of these measures the two edges of such a belt are automatically and permanently kept synchronized. So long as the markers on both edges pass simultaneously through the detectors no control pulse is transmitted by the latter to the means actuated thereby, but if a marker on one edge of the belt moves ahead of the corresponding marker on the other edge, the detector associated with the leading edge will be energized by the marker in question and transmit a control pulse to the means on which it is adapted to act, these means lengthening at least one edge of the belt until the two edges are re-synchronized. Thus the energization of a detector is always dependent on the marker on one edge being in advance, whereas the marker on the following edge has no effect, through its associated detector, on the means for varying the length of at least one edge. Once the markers on both edges reach their associated detectors simultaneously again the means for varying the length of the edge will remain unaffected by the detectors.

The stretch which must be imposed by the means acted on by the associated detector in order to synchronize the leading edge must in any case be greater than that of the following edge. The edge having the marker which initiates the first detector pulse is thus also the one which is lengthened. Because of this stretching a point, e.g. the measuring point or marker on the leading edge that initiates the pulse, must cover a greater distance than a point behind it on the following edge. The stretch is maintained by the means acted on by the detector of the leading edge until—substantially after one or more circuits of the belt—the said points in both edges are re-synchronized.

The provision of stationary detectors at both edges of a flat conveyor belt is known per se but for a different purpose, namely e.g. to compensate for the tendency to move transversely to the direction of movement of the conveyor belt, due to different stresses in the portions of belt on both sides, i.e. to return the belt to its central position, the detectors in question being influenced by any transverse movement of the edges of the belt. However, this problem of lateral movement in flat conveyor belts does not occur in tubular belts of the type here considered. In the synchronizing control according to the invention the stationary detectors are affected not by transverse movements of the edges of the belt but by markers provided at the edges in cases where the two edges move relatively to one another longitudinally of the belt. Thus the function of the detectors is here to compensate for differences in the moving time of the edges in belts where the drawing members are provided in said edges, the purpose being not to prevent the belt from straying crosswise—which does not occur—but to avoid transverse strains and tears in the tubular belt.

The variation in the length of at least one edge which is necessary for the synchronizing control is preferably effected by means of two adjacent pulleys for deflecting the two edges of the belt; these are interconnected by the beam of a balance, the alignment of which determines the relative position of the pulleys and can be changed by the means acted on by the detector in question. The pulleys required for the purpose may be the deflecting pulleys (discs) provided at the end of a conveying run or else additional rollers provided only for the synchronizing control according to the invention and deflecting the belt only over a small portion of the periphery of the rollers. As the two edges of the belt are usually under equal tension the swinging of the balance beam brought about by the synchronizing controls not only stretches the leading edge but reduces the stretch (basically produced by the pre-tension) of the following edge, thereby re-synchronizing the two edges all the earlier. The arrangement is desirably such that the means acted on by a detector comprise an adjusting device which causes the balance beam to swing about its bearing and thus changes the relative position of the deflecting pulleys in question.

With the synchronizing control proposed in the invention a certain controlling inertia is inevitable in practice. Before the synchronizing control has taken effect and the edges have been re-synchronized this causes the edges to stray temporarily from one another. Although the effect is not very noticeable while the belt is in tubular form it may lead to transverse tensions and thus tearing when the tube shape collapses in the empty returning part of the belt and at its loading and unloading station. In order to avoid such damage steps are preferably taken to maintain the taut tubular shape of the belt in all parts of its circuit, including the empty returning length. To this end the invention further proposes to give the belt transverse corrugation outside the region of its edges and to make the wall region where the crests of the corrugations merge with the roots thereof substantially perpendicular to the neutral bending zone of the belt. Transverse corrugation is in fact known per se in tubular conveyor belts with drawing members arranged in the centre; it enables the members to function in curved arrangement in a horizontal plane but is not sufficiently resistant to bending to keep the empty returning portion of the belt in its taut tubular shape. In belts of this kind with drawing members in their beaded edges only the transverse corrugation according to the invention has sufficient resistance to bending to prevent the corrugations from kinking; thus even the empty returning length of belt maintains its tubular shape, which is far less sensitive to straying of the edges than are other sectional shapes, so transverse tears can be avoided even though there is some inertia in the controls. Even in the portions of the belt which are opened at the unloading and loading stations such corrugation completely eliminates any kinks or transverse tears which might otherwise result from temporary straying of the edges of the belt that could not be detected owing to the possible inertia of the synchronizing control. A further advantage of such transverse corrugation in the conveyor belt is that the belt can now be operated quite freely in space, that is to say, e.g., can be deflected from a horizontal to a vertical plane. It is particularly for belts thus operated that the synchronizing control according to the invention is specially advantageous. This is because the total transporting distance is relatively long, because a considerable number of deflections are necessary in the belt and above all because the belt is exposed to different temperatures in the paths lying at different levels, which is usually particularly the case within the perpendicular transporting paths.

Further to increase the resistance of the belt to bending, it is necessary to maintain the taut tubular shape which obviates transverse tears; it is advisable for the crests and roots of the corrugations to be arcuate in section, thereby reducing the stretching of the belt when it is deflected. It is also an advantage for the arcs at the crests of the corrugations to be smaller than those in the roots, since this facilitates the cleaning of the belt when residual material has been deposited in the roots.

A preferred embodiment of the invention will now be described with reference to the accompanying drawings in which:

FIG. 1 shows diagrammatically in elevation a circling transversely corrugated tubular conveyor belt according to the invention which is opened out for loading in the middle of the bottom run and opened out for unloading in the middle of the top run;

FIG. 2 is a cross-section taken along the line II—II through the belt in FIG. 1;

FIG. 3 is a section along the line III—III in FIG. 2 showing a preferred shape for the corrugation in the conveyor belt according to the invention;

FIGS. 4 and 5 are sectional (substantially at IV—IV of FIG. 1) and plan views respectively showing the central components of the synchronizing controls for the conveyor belt with the two edges of the belt synchronized;

FIGS. 6 and 7 are views of the controls similar to FIGS. 4 and 5 but with one edge of the belt in the lead; and FIGS. 8 and 9 are views similar to those in FIGS. 4 to 5 and 6 to 7 but with one edge of the belt lagging behind.

The transversely corrugated tubular conveyor belt 1 is guided by drawing members 3 and 3' provided in its beaded edges 2 and 2' and passing over deflecting pulleys 4 equipped with gripping means (not shown). At the two edges 2 and 2' there are at least two stationary photoelectric detectors 5 and 5' through which dark markers 6 and 6' provided at said edges pass simultaneously when the edges of the belt are moving synchronously. When edge 2' is in the leading position as shown in FIG. 7, marker 6' provided thereon first energizes the associated detector 5'. As a result detector 5', acting through a conventional amplifier 7, causes an adjusting motor 8 to rotate a screw-threaded shaft 9 and move a carriage 10 mounted thereon. The carriage is moved in a direction such as to swing the balance beam 11 supported on the carriage and interconnecting the two pulleys 4 and 4' about its bearing 12 as shown in FIG. 6. The rising arm of beam 11 thereby moves pulley 4' (the pulleys 4 and 4' are mounted in suitable slidable bearings) associated with leading edge 2' upwardly so that the leading edge 2' is extended to such a degree that marker 6', which is initially in the lead, has to cover a longer distance and after a time is therefore re-synchronized with marker 6 on the following edge 2. Thus by moving the pulley 4' upwardly the bend in the leading edge 2' is increased and the distance any given point on endless edge 2' must travel to make a complete circuit is increased and the time for making said circuit is increased, since the speed of travel of said point remains the same. Also by moving the pulley 4 downwardly simultaneously the bend in the leading edge 2 decreases and approaches a straight line and the distance any given point on endless edge 2' must travel to make a complete circuit is decreased and the time for making said circuit is decreased, since the speed of travel of said point remains the same. If the difference is over-compensated for so that marker 6' lags behind marker 6 as illustrated in FIGS. 8 and 9, marker 6 on the then leading edge 2 will be the first to reach its associated detector 5. Detector 5, acting through amplifier 7, adjusting motor 8 and spindle 9 will thus move carriage 10 to the other side and make the other arm of beam 11 rise so that the deflecting pulley will extend edge 2 until the two edges of the belt are again running synchronously.

The transverse corrugation 13 reproduced in FIG. 3 as section III—III from FIG. 2 has crests 14 and roots 15 of arcuate section; the wall region where these crests and roots merge is substantially perpendicular to the neutral bending zone 16 of the belt 1.

FIG. 2 shows the conveyor belt 1 with profiled elongated strips 17 extending between the deflecting pulleys 4 and placed on edges 2 and 2', the latter embracing the loosely inserted drawing cables 3 and 3'. The edges 2 and 2' are brought out of strips 17 in such a way that their marginal regions merging with tube 1 lie immediately against one another between strips 17 under the pressure of pulleys 4.

I claim:

1. A tubular conveyor belt having edge portions adapted to engage a driving means therefor, the belt having corrugations outside the region of the edge portions, the wall region of the belt where the crests and roots of the corrugations merge being substantially perpendicular to the neutral bending zone of the belt.

2. A tubular conveyor belt as set forth in claim 1 wherein the crests and roots of the corrugations are arcuate in cross-section.

3. A tubular conveyor belt as set forth in claim 2 wherein the arcs of the crests are smaller than the arcs of the roots.

References Cited

FOREIGN PATENTS 1,246,082  10/1960  France.

EVON C. BLUNK, *Primary Examiner.*

E. A. SROKA, *Assistant Examiner.*